Dec. 14, 1926. 1,610,450
G. JULIAN
TURN SOLE MOLDING MACHINE
Filed Feb. 9, 1920 2 Sheets-Sheet 2
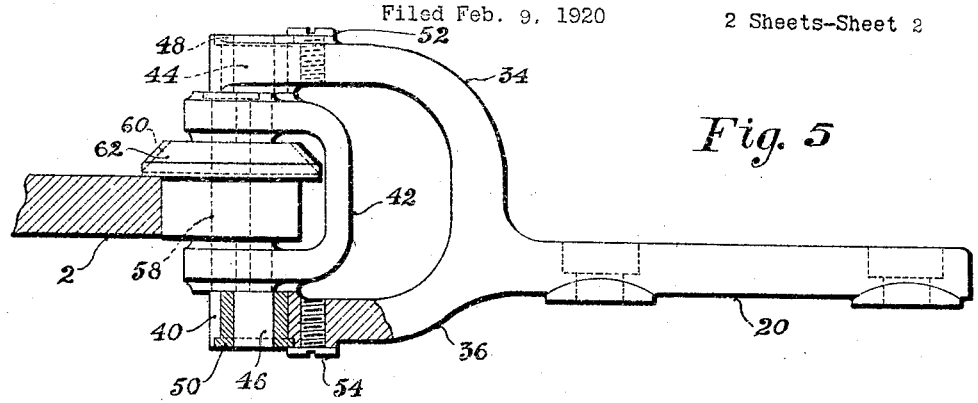
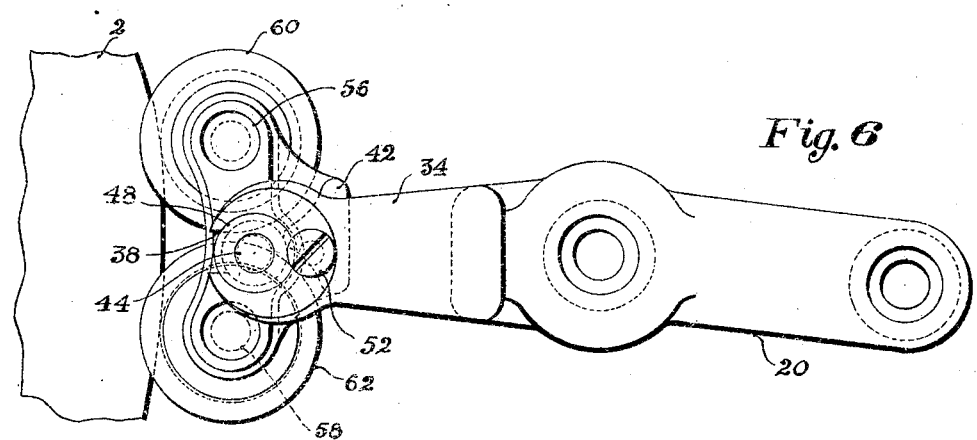
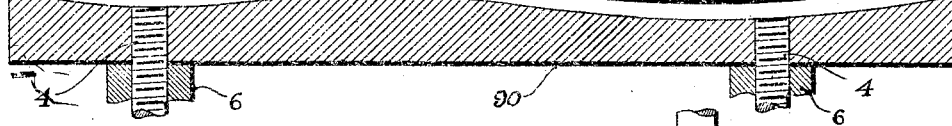
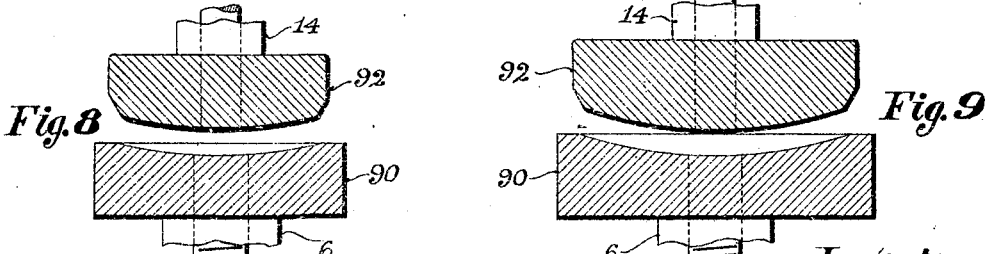

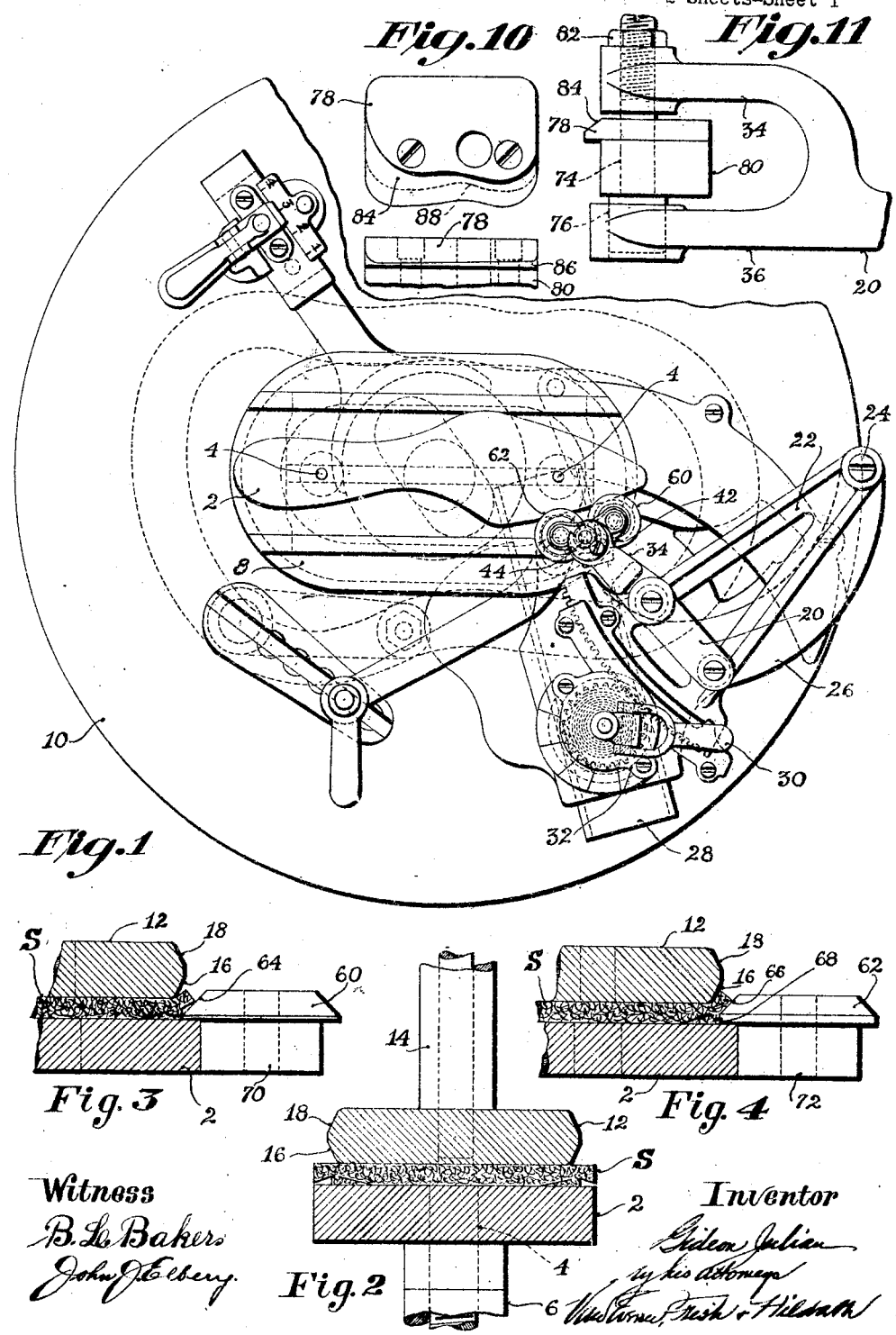

Patented Dec. 14, 1926.

1,610,450

UNITED STATES PATENT OFFICE.

GIDEON JULIAN, OF BEVERLY, MASSACHUSETTS, ASSIGNOR TO UNITED SHOE MACHINERY CORPORATION, OF PATERSON, NEW JERSEY, A CORPORATION OF NEW JERSEY.

TURN-SOLE-MOLDING MACHINE.

Application filed February 9, 1920. Serial No. 357,431.

This invention relates to means and methods for molding the soles of shoes and is herein illustrated as embodied in a machine for molding the margins of turn soles.

Heretofore it has been customary to mold the margins of turn soles, after the channeling has been completed, by means of guiding the sole manually to pass its peripheral margin between two rollers which are rotated to feed the work and which engage the opposite sides of the sole margin, these rollers being suitably formed to mold or bend the material of the sole to the required form. A machine of this type is illustrated and described in Letters Patent of the United States to W. C. Meyer No. 1,110,637 dated September 15, 1914. Prior to the molding operation the soles may be shaped to the desired form by trimming them to the shape or outline of a pattern on which the sole blank is immovably clamped while a trimming knife traverses the periphery of the pattern. Such a machine, known as a sole rounding machine, is illustrated and described in Letters Patent of the United States to Charles L. Allen, No. 881,994 dated March 17, 1908. It is proposed by means of the present invention, to mold the margin of the sole while the sole is clamped on a pattern like that by which the blank is shaped. An advantage of performing the molding operation in this manner, while the sole is held immovable, is that the line of the break, which for perfect shoe making should follow exactly the outline of the last bottom on which the shoe is to be built, may be definitely and accurately determined more readily than heretofore., Accordingly one object of the invention is to provide an improved machine adapted to facilitate producing a molded turn sole in which the line of the break on the grain side is opposite the sewing shoulder on the flesh side throughout the entire length of the break. To this end one feature of the invention resides in the provision of a sole clamp, in a machine of the general character described in said Allen patent, formed with a beveled lower edge thus providing a marginal shoulder or break over which the margin of the sole on the pattern may be bent or molded, and a tool for engaging the margin of one face of the sole for creating said bend or mold. In a preferred form of the invention the molding tool is mounted upon mechanism which may be actuated to cause the tool to travel around the periphery of the pattern. Preferably the sole clamp is formed with a beveled edge on both faces so that it can be employed for molding both right and left soles. Conveniently the arm which supports the sole trimming knife of the sole rounding machine is utilized to carry the molding tool.

It is within the scope of the invention to utilize a pattern and a clamp having complemental surface contours formed to concave the forepart and heel seat of the sole in a manner to approximate the contour of the bottom of the last on which the shoe is to be built, in which event a sole is thus additionally surface molded at the same time that its margin is broken down as hereinbefore explained, although under this aspect of the invention separate patterns and clamps must be used for right and left soles.

It is often desired to impart to the margin of a sole a comparatively large amount of bending action and it has been found that if the total amount of pressure required to produce this bending action is imparted to the margin in a single stage or application, cracking of the leather along the line of bending or weakening of the sole in other and similar ways is likely to occur. With the foregoing in view, in an important aspect, the invention provides a novel method of molding turn shoe soles which consists in gradually breaking down the margin of the sole by immediately succeeding increasing pressures applied progressively completely around the periphery of the sole.

To the accomplishment of this object the invention comprises the features and combinations of parts hereinafter described in connection with the accompanying drawings and then particularly pointed out in the appended claims.

In the accompanying drawings the invention is illustrated for purposes of explanation as embodied in a sole fitting machine of the type known as the "Planet sole rounder" and disclosed in the patent to Allen hereinbefore referred to. In the drawings Figure 1 is a plan of the table of the sole rounder disclosed in the Allen patent with the parts above the pattern removed; Fig. 2 is a lateral section through a sole clamped on the pattern in position to be operated upon; Figs. 3 and 4 are lateral sections similar to Fig. 2 showing the preliminary and final molding operations; Figs. 5 and 6 are an elevation and plan, respectively, of the molding tool and its supporting arm; Fig. 7 is a longitudinal section through a pattern and clamp for receiving a sole molded to the contour of the shoe bottom; Figs. 8 and 9 are lateral sections through the heel and forepart of the pattern and clamp shown in Fig. 7; Fig. 10 is a plan of a modified form of molding tool; and Fig. 11 is an elevation of the tool carrying end of the supporting arm with the modified tool mounted thereon.

The general mode of operation of the illustrated machine is identical with that of the Planet sole rounder fully described in said patent to Allen. As in said machine, the sole pattern 2, forming one element of the sole clamping couple, is supported on pins 4 carried by two adjustable posts 6 rising from the usual cam plate 8 sustained on a rotary table 10. A turn sole S is clamped rigidly on the pattern 2 by a clamping plate 12 sustained on supports 14 depending from a clamp carrier held in the usual overhanging portion of the frame (not shown). The clamping plate 12 is provided with a beveled edge 16 on its sole engaging face to form an angular surface against which the margin of the sole S may be pressed when it is broken down by a sole molding tool. When molding flat soles the clamp 16 may conveniently have its other edge beveled, as shown at 18 (Figs. 2 to 4) and then be used for both rights and lefts by simply reversing it. The sole molding tool, of which two forms are shown, is mounted on the end of the usual rounding knife arm 20 rigidly secured to a segmental shaped plate 22 pivotally mounted at 24 on a carrier 26 (Fig. 1). The carrier 26 is mounted to slide inwardly and outwardly, toward and from the pattern 2, on a guide 28 secured to the rotary table 10. A hand lever 30 tensions a spring within a drum 32 for urging the moulding tool toward the pattern, and this handle may be used to withdraw the tool from the pattern when desired. The molding operation is accomplished by rotating the table 10 and thus transferring the molding tool around the periphery of the sole while the latter remains in a fixed position. the cam plate 8, sliding carrier 26 and spring within the drum 32 combining by their action to maintain the tool in operating position relative to the pattern 2. As in the sole rounding machine a clutch mechanism (not shown) is actuated by the operator to cause the molding tool to travel completely around the periphery of the pattern.

The form of sole molding tool shown in Figs. 5 and 6 will be described first. The arm 20 is provided with a forked tool carrying end providing upper and lower tool supports 34 and 36. Each of these supports is slotted, see 38 Fig. 6 and 40 Fig. 5, so that a U-shaped tool carrier 42 having upper and lower swivel pins 44 and 46 may be slipped into position within the fork by an inward movement. At their inner ends the slots 38 and 40 are bored for the reception of thimbles 48 and 50 (see section in Fig. 5) which are slipped endwise over the swivel pins and form bearings therefore. The thimbles are held in place by headed set screws 52 and 54. The tool carrier 42 is elongated in plan (see Fig. 6) and is bored at each end for the reception of vertical pins 56 and 58 inserted with a driving fit and each carring a freely rotatable roll, forming one element of the molding tool. A leading roll 60 on the pin 56 performs a preliminary lifting operation while a following roll 62 on the pin 58 performs the final setting operation, the two together co-operating completely to break down the margin of the sole in the desired manner. The roll 60, best shown in Fig. 3, is provided with a beveled edge 64 so proportioned as to permit its ready introduction between the pattern and the marginal portion of one face of the sole, lifting the sole margin, however, only part way toward its final position. The roll 62, best shown in Fig. 4. is provided with a bevel 66 and a vertical edge 68 so proportioned as to fill the space between the pattern and the marginal portion of one face of the sole when the grain side of the sole margin is in contact with the bevel 16 of the clamp 12, the roll 62 forcing the sole margin against the clamp 12 with considerable pressure. The clamp is so proportioned that the lower angle of the bevel 16 is transversely opposite the base of the shoulder cut on the sole thus insuring that the line of the molding break will be at the edge of the last when the sole is placed thereon in assembling the shoe. It will be observed that the breaking down operation proceeds gradually, or in two successive steps, thus insuring accuracy and permanence in the final setting of the sole margin. Below each portion of the molding tool and preferably integral therewith are gages 70 and 72 which bear on the edge of the pattern and maintain the tool in proper relation to the sole. The spacing of the two portions of the tool permits its travel around the toe end of the pattern, the pattern at this time projecting between the gages 70 and 72.

The preferred form of molding tool, through which all of the advantages just described are also secured, is shown in Figs. 10 and 11. In this form the preliminary lifting and final setting portions are combined in one member and the mounting on the tool carrying arm 20 is simplified. The upper fork member 34 is provided with a threaded bore and the lower fork member 36 is provided with a smooth bore. A pin 74 having an enlarged lower end 76 is threaded into the upper bore and forms a swivel pin for the sole molding tool 78. This tool is secured by screws (Fig. 10) to a gage block 80 which is seated on the shoulder formed by the enlarged end 76. By rotating the pin 74 the tool 78 may be adjusted vertically to accommodate it to the elevation of the sole, which varies to some degree, according to the thickness of the pattern 2. A lock nut 82 is provided to hold the adjustment. It will be observed from Fig. 10 that the sole molding portion of the tool 78 is so shaped as to combine in one member the two sole molding portions of the rolls 60 and 62. The bevel 84 is relatively flat at the forward end of the tool but by a gradual change becomes quite abrupt at the rear end, and the vertical wall 86 at the front edge increases in height from its forward to its rear end. This formation provides for the gradual forcing of the sole margin into contact with the bevel 16 of the clamp 12 as heretofore described. Both the tool 78 and gage 80 are provided with a central vertical depression 88, as illustrated by Fig. 10, to permit the tool to travel smoothly around the toe of the sole while maintaining its operating position.

It will be observed that in both forms of the molding tool the pivotal point is off-center with respect to the two acting portions of the tool. The pivot is placed somewhat to the rear of the center, and thus more directly behind the margin setting portion of the tool, so that the pressure will be greatest at the finishing operation rather than at the preliminary margin lifting operation.

In Figs. 7 to 9 there are illustrated a pattern 90 and a beveled clamp plate 92, which are complementally shaped to deform or mold the sole so as to produce, for example, a concaved forepart and heel seat when the sole is clamped therebetween and thus avoid the necessity of peening the sole by means of a hammer, prior to assembly on the last, in the manner disclosed in Letters Patent of the United States to Edward Erickson No. 1,254,894, dated January 29, 1918. All points on the margin of the molding pattern 90 lie in the same plane so the operation of the sole molding tool is not interfered with when the additional molding operation is performed by the machine. In fact, the operation of the sole molding tool is facilitated inasmuch as the surface molding of the sole tends to lift the sole margin so that the molding tool may more readily enter between the lower clamp plate and the sole.

The operation of the machine has been sufficiently explained in connection with the preceding description, but attention is directed to Figs. 2 to 4 which illustrate the gradual lifting of the sole margin into final position by either form of sole molding tool. It will be understood, of course, that the margin of the sole ordinarily is broken down only throughout the shouldered portion thereof and hence the sole clamp is cut away or relieved at its heel end (see Fig. 7) to permit the molding tool, when traversing this end of the sole, to merely lift the margin without any molding action.

The nature and scope of the present invention having been indicated and the preferred embodiments of the invention having been specifically described, what is claimed as new, is:—

1. A machine for molding turn soles having, in combination, means for holding the sole rigid, a device for breaking down the margin of the sole by bending it into a plane oblique to the sole face, and means for causing the point of operation of said device to be transferred around the sole.

2. A machine for molding turn soles having, in combination, a clamp at each side of the sole, one of said clamps having a beveled edge on its sole engaging face, and pressure means for entering between the sole and the unbeveled clamp acting to mold the margin of the sole against said bevel upon transferring its point of operation around the sole.

3. A machine for molding turn soles having, in combination, means for clamping the sole, a tool adapted to engage the margin on one face of the sole constructed and operating to bend and set said margin into a plane oblique to the sole face, and means relatively to move the sole and tool to cause a progressive operation of the tool about the periphery of the sole.

4. A machine for molding turn soles having, in combination, means for clamping the sole in a fixed position, a tool adapted to engage the margin on one face of the sole and set it at an angle to the sole face, and means for moving said tool about the periphery of the sole.

5. A machine for molding turn soles having, in combination, a pair of clamps for holding the sole in a fixed position but leaving its margin relatively free, a tool adapted to engage said margin and shaped to set it against one of said clamps at an angle to the sole face, and mechanism for causing said tool to traverse the periphery of the sole.

6. A machine for molding turn soles having, in combination, means for clamping the sole to hold it rigid, a tool carrying arm, means for pressing said arm toward the sole, a molding tool swiveled on the end of said arms for engaging the margin of the sole, and means for moving the clamping means and arm relatively to effect a progressive breaking down of said margin.

7. A machine for molding turn soles having, in combination, means for clamping the sole to hold it rigid, a tool carrying arm, means for pressing said arm toward the sole, a molding tool pivoted on the end of said arm, said pivot being off center relative to the acting portion of said tool, and means for moving the clamping means and arm relatively to effect a progressive molding of the sole.

8. A machine for molding turn soles having, in combination, a tool carrying arm rotatable in a horizontal plane, a molding tool on the end thereof for engaging the margin at one face of the sole to bend the margin into a plane oblique to the sole face, means for clamping the sole in a fixed position within the orbit of said arm, and means for causing said tool to traverse the periphery of the sole and maintain contact therewith.

9. A machine for molding turn soles having, in combination, means for clamping the sole to hold it rigid, a molding tool adapted to engage the margin on one face of the sole and set it at an angle to the sole face, said tool having successively acting preliminary lifting and final setting portions, and means for effecting a relative movement between the clamping means and tool to transfer the point of operation of the tool around the sole.

10. A machine for molding turn soles having, in combination, a sole pattern having a sole clamped thereon but leaving its margin relatively free, a molding tool having an acting portion extending between said pattern and free sole margin, a gage member associated with said tool to bear on the edge of the pattern, and means for causing the point of operation of the tool to be transferred around the sole.

11. A machine for molding turn soles having, in combination, a pair of clamps complementally shaped to surface mold a sole in a manner to approximate the contour of a last bottom, one of said clamps having a beveled edge on its sole engaging face, and a molding tool for entering between the sole and the unbeveled clamp acting to mold the margin of the sole against said bevel upon transferring its point of operation around the sole.

12. A machine for molding turn soles having, in combination, a clamp at each side of the sole, one of said clamps having a beveled edge on its sole engaging face, a molding tool formed to enter between the sole and unbeveled clamp having an acting portion shaped to gradually force said margin toward and into contact with said bevel, and means for causing said tool to traverse the periphery of the sole.

13. A sole molding machine having a pair of clamp members between which a sole may be clamped, one of said members being provided with a beveled edge on its sole engaging face, and a molding tool having a molding edge for engaging the margin at one face of the sole and shaped to bend said margin against said beveled edge.

14. A sole molding machine having a pair of clamp members between which a sole may be clamped, one of said members being provided with a beveled edge on its sole engaging face, and a molding tool having a leading edge shaped to lift the sole margin toward said beveled edge, and a following edge shaped to force the sole margin into contact with said beveled edge.

15. A machine for operating upon soles having, in combination, a pair of clamping plates constructed and arranged to deform a sole clamped therebetween, and means for progressively breaking down the periphery of the sole by bending said periphery while the sole is so clamped.

16. A machine for operating on soles having, in combination, a pair of clamp members having complemental surface contours shaped to concave the surface at one side of a sole clamped therebetween, and a tool arranged to engage the margin at one side of a sole so clamped and to operate progressively about the periphery of the sole.

17. A machine for operating upon sheet material having, in combination, a pair of mold members arranged to deform a sheet of material clamped therebetween, and a tool arranged to engage and operate progressively about the margin at one face of the sheet material while so clamped to bend said margin into a plane oblique to the sole face.

18. A machine for operating on soles having, in combination, a pair of clamp members relatively movable to mold a sole, a tool arranged to engage and operate progressively about the margin at one face of a sole so clamped, and means for relatively moving said tool and said clamp members to transfer the point of operation of the tool entirely around the margin of the sole.

19. A machine for operating upon sheet material having, in combination, a pair of mold members arranged to deform a sheet of material clamped therebetween, and a tool arranged progressively to break down the peripheral portion of the sheet material while so clamped.

20. The method of molding turn soles which comprises holding the sole rigid with its margin relatively free, and breaking down the margin during a single continuous traverse of the periphery of the sole by a preliminary and then a final pressure on said margin.

21. The method of molding turn soles which comprises a gradual breaking down of the margin by immediately succeeding increasing pressures applied progressively around the periphery of the sole during a single continuous traverse thereof.

22. A sole molding machine having, in combination, a pattern, a clamp formed with oppositely facing surfaces and arranged to co-operate with the pattern in maintaining a sole in a fixed position, each of said oppositely facing surfaces having a beveled edge extending about its peripheral portion, and a tool adapted to engage the margin of the sole to shape it against the beveled edge of one side of the clamp for operating upon a right sole and to shape the sole against the beveled edge of the other side of the clamp to operate upon a left sole.

GIDEON JULIAN.